(12) United States Patent
Kim et al.

(10) Patent No.: US 10,316,935 B2
(45) Date of Patent: Jun. 11, 2019

(54) PLANETARY GEAR TRAIN OF AUTOMATIC TRANSMISSION FOR VEHICLES

(71) Applicants: HYUNDAI MOTOR COMPANY, Seoul (KR); KIA MOTORS CORPORATION, Seoul (KR)

(72) Inventors: Jin Ho Kim, Suwon-si (KR); Dong Hwan Hwang, Seoul (KR); Jong Sool Park, Hwaseong-si (KR); Jong Soo Kim, Seoul (KR); Kyeong Hun Lee, Seoul (KR)

(73) Assignees: Hyundai Motor Company (KR); KIA Motors Corporation (KR)

( * ) Notice: Subject to any disclaimer, the term of this patent is extended or adjusted under 35 U.S.C. 154(b) by 135 days.

(21) Appl. No.: 15/711,402

(22) Filed: Sep. 21, 2017

(65) Prior Publication Data

US 2018/0328459 A1   Nov. 15, 2018

(30) Foreign Application Priority Data

May 10, 2017   (KR) .................. 10-2017-0058303

(51) Int. Cl.
*F16H 3/62*   (2006.01)
*F16H 57/00*   (2012.01)
*F16H 57/02*   (2012.01)

(52) U.S. Cl.
CPC .......... *F16H 3/62* (2013.01); *F16H 57/0018* (2013.01); *F16H 2057/02047* (2013.01); *F16H 2057/02095* (2013.01); *F16H 2200/0069* (2013.01); *F16H 2200/2015* (2013.01); *F16H 2200/2046* (2013.01)

(58) Field of Classification Search
None
See application file for complete search history.

(56) References Cited

U.S. PATENT DOCUMENTS

| 7,458,913 B2 * | 12/2008 | Haka | ...................... F16H 3/663 475/146 |
| 2007/0004546 A1 * | 1/2007 | Haka | ...................... F16H 3/663 475/59 |

* cited by examiner

*Primary Examiner* — Colby M Hansen
(74) *Attorney, Agent, or Firm* — Brinks Gilson & Lione

(57) ABSTRACT

A planetary gear train of an automatic transmission for a vehicle is provided to improve power delivery and fuel efficiency by applying six engaging elements to five planetary gear sets to achieve ten forward speed stages and one reverse speed stage. The planetary gear train includes: an input shaft; an output shaft; first to fifth planetary gear sets each including three rotation elements; three clutches and three brakes as the six engaging elements; and first to ninth shafts. In particular, the third shaft fixedly connects seventh, tenth and thirteenth rotational elements, and the fourth shaft fixedly connects sixth and fifteenth rotational elements. In addition, the fifth shaft fixedly connects third and fourth rotational elements, the sixth shaft fixedly connects fifth and eighth rotational elements, and the seventh shaft fixedly connects ninth and eleventh rotational elements.

17 Claims, 2 Drawing Sheets

FIG. 2

Figure 1:
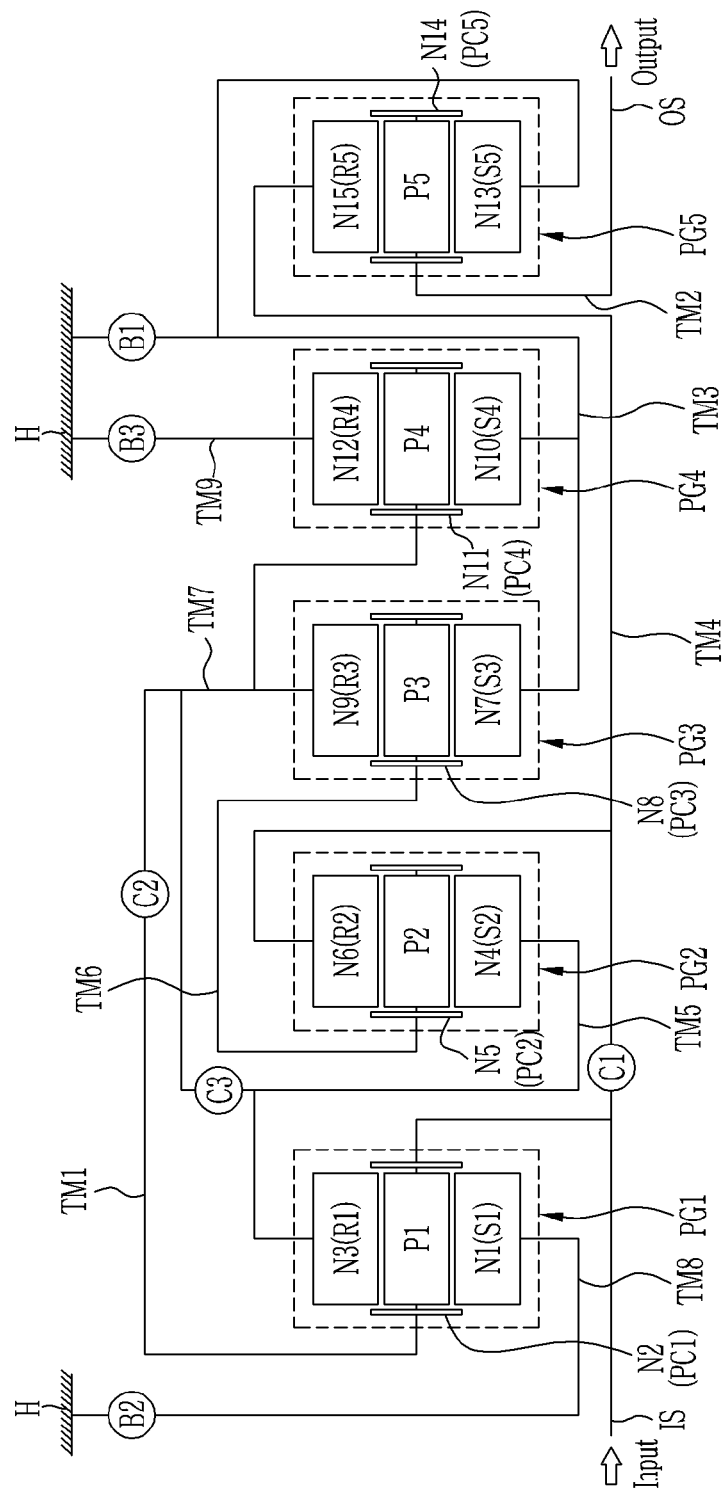

| Speed stage | Engaging element | | | | | | Gear ratio | Ratio between gear shift stages | |
|---|---|---|---|---|---|---|---|---|---|
| | C1 | C2 | C3 | B1 | B2 | B3 | | | |
| D1 | | ● | | | ● | | 4.36 | 1.417 | |
| D2 | ● | ● | ● | ● | | | 3.078 | 1.416 | |
| D3 | ● | | ● | ● | ● | | 2.173 | 1.350 | |
| D4 | ● | ● | ● | ● | | | 1.61 | 1.332 | |
| D5 | ● | | ● | | ● | | 1.209 | 1.209 | |
| D6 | ● | | ● | | | | 1 | 1.196 | |
| D7 | ● | | | | ● | ● | 0.836 | 1.133 | |
| D8 | | ● | | | | ● | 0.738 | 1.264 | |
| D9 | | ● | | | ● | ● | 0.584 | 1.270 | |
| D10 | | | | ● | ● | ● | 0.46 | - | Gear ratio span : 9.48  R/D1 ratio : 0.7 |
| REV1 | | | | | ● | ● | -3.079 | | |

PLANETARY GEAR TRAIN OF AUTOMATIC TRANSMISSION FOR VEHICLES

CROSS-REFERENCE TO RELATED APPLICATION

This application claims priority to and the benefit of Korean Patent Application No. 10-2017-0058303, filed on May 10, 2017, which is incorporated herein by reference in its entirety.

FIELD

The present disclosure relates to a planetary gear train of an automatic transmission for a vehicle.

BACKGROUND

The statements in this section merely provide background information related to the present disclosure and may not constitute prior art.

Research to provide more shift-stages of an automatic transmission has been conducted to enhance fuel consumption and better drivability.

In the field of the automatic transmission, a structure of the multistage transmission having the excellent linearity of the interstage ratio relates to a drivability such as an acceleration before and after the gear shift as well as a rhythm feeling of the engine speed.

However, as the number of shift stages is increased, the number of parts of the automatic transmission is increased, and as a result mountability, cost, weight, delivery efficiency, and the like are undermined.

As an effort to increase the fuel efficiency by multi-staging with reduced number of parts, an eight-speed automatic transmission has been introduced recently and a planetary gear train for an automatic transmission enabling more shift-stages has been developed.

However, in the case of the recent eight-speed automatic transmission, we have discovered that because a span of a gear shift ratio (a factor for providing the linearity of the ratios between gear shift stages) is maintained at a level of 6.5 to 7.5, a power performance and a fuel consumption with a downsized engine is below a desired level of efficiency.

Also, in the eight-speed automatic transmission, it is disadvantage to provide the linearity of the ratios between gear shift stages when the span of the gear shift ratio rises to a level of 9.0 or more because the operation efficiency of the engine and the drivability of the vehicle are deteriorated.

The above information disclosed in this Background section is only for enhancement of understanding of the background of the present disclosure and therefore it may contain information that does not form the prior art that is already known to a person of ordinary skill in the art.

SUMMARY

The present disclosure has been made in an effort to provide a planetary gear train of an automatic transmission for a vehicle that improves power delivery performance and fuel efficiency by applying six engaging elements instead of five planetary gear set for reducing a drag loss of a clutch and a brake while achieving ten forward speed stages and one reverse speed stage.

Also, the present disclosure provides a planetary gear train of an automatic transmission for a vehicle increasing a torque delivery efficiency and a durability by reducing a torque sharing of each planetary gear set and each engaging element through an application of a torque in parallel method to a planetary gear set of an output side.

Also, the present disclosure is to provide a high efficiency planetary gear train of an automatic transmission for a vehicle with an excellent linearity of a ratio between gear shift stages for increasing a flexibility of an output gear ratio by applying five planetary gear sets to realize a shift-stage of the ten forward speed stages and one reverse speed stage.

In one form of the present disclosure, a planetary gear train of an automatic transmission for a vehicle includes: an input shaft receiving torque of an engine; an output shaft outputting torque; a first planetary gear set including first, second, and third rotation elements; a second planetary gear set including fourth, fifth, and sixth rotation elements; a third planetary gear set including seventh, eighth, and ninth rotation elements; a fourth planetary gear set including tenth, eleventh, and twelfth rotation elements; a fifth planetary gear set including thirteenth, fourteenth, and fifteenth rotational elements; a first shaft connected to the second rotational element and the input shaft; a second shaft connected to the fourteenth rotational element and the output shaft; a third shaft connected to the seventh rotational element, the tenth rotational element, and the thirteenth rotational element; a fourth shaft connected to the sixth rotational element and the fifteenth rotational element; a fifth shaft connected to the third rotational element and the fourth rotational element; a sixth shaft connected to the fifth rotational element and the eighth rotational element; a seventh shaft connected to the ninth rotational element and the eleventh rotational element; an eighth shaft connected to the first rotational element; and a ninth shaft connected to the twelfth rotational element.

The planetary gear train may include six engaging elements selectively connecting two shafts selected from the nine shafts to each other, or a corresponding shaft selected from the nine shafts to a transmission housing, and configured to realize forward or reverse speed stages by controlling three engaging elements selected from the six engaging elements.

The six engaging element may include three clutches interconnecting two shafts among the nine shafts, and three brakes selectively connecting the corresponding shaft to the transmission housing, wherein the corresponding shaft is not connected to the input shaft or the output shaft.

The six engaging element may include: a first clutch disposed between the first shaft and the fourth shaft; a second clutch disposed between the first shaft and the seventh shaft; a third clutch disposed between the fifth shaft and the seventh shaft; a first brake disposed between the third shaft and the transmission housing; a second brake disposed between the eighth shaft and the transmission housing; and a third brake disposed between the ninth shaft and the transmission housing.

The first, second, and third rotational elements may be a first sun gear, a first planet carrier, and a first ring gear, respectively, the fourth, fifth, and sixth rotational elements may be a second sun gear, a second planet carrier, and a second ring gear, respectively, the seventh, eighth, and ninth rotational elements may be a third sun gear, a third planet carrier, and a third ring gear, respectively, the tenth, eleventh, and twelfth rotational element may be a fourth sun gear, a fourth planet carrier, and a fourth ring gear, respectively, and the thirteenth, fourteenth, and fifteenth rotational elements may be a fifth sun gear, a fifth planet carrier, and a fifth ring gear, respectively.

The first, second, third, fourth, and fifth planetary gear sets may be disposed in a sequence of the first, second, third, fourth, and fifth planetary gear sets from an engine side.

An exemplary form of the present disclosure may realize ten forward speed shift-stages and one reverse speed shift-stage by combining five planetary gear sets made of the simple planetary gear set and by six engaging elements.

In addition, since the gear shift ratio span is secured to be greater than 9.4, driving efficiency of the engine may be increased. In addition, since linearity of the ratios between gear shift stages can be secured due to multiple speed stages, drivability such as acceleration before and after shift, rhythmical engine speed, and so on may be improved.

In addition, ten forward speed stages and one reverse speed stage are achieved while the application of the engaging elements is reduced, thereby improving torque delivery efficiency and fuel economy due to reduced drag loss of the clutches and the brakes.

In addition, since a planetary gear set of an output side in torque parallel type is used and torque is evenly shared to each planetary gear set and each engaging element, torque delivery efficiency and durability may be improved.

In addition, since five planetary gear sets are used to achieve ten forward speed stages and one reverse speed stage, flexibility of output gear ratios may be increased and linearity of step ratios may be improved.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 is a schematic diagram of a planetary gear train in an exemplary form of the present disclosure; and FIG. 2 is an operational chart for each shift-stage of an engaging element applied to a planetary gear train in an exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

However, contents that are not associated with a description will be omitted in order to clearly describe an exemplary form of the present disclosure, and components that are the same as or are similar to each other will be denoted by the same reference numerals throughout the present specification.

In the following description, the same components are classified into first, second, and the like to differentiate names for components and a sequence thereof is not necessarily limited thereto.

Further, as used herein, description of elements being "fixedly" connected or interconnected includes elements that are directly connected, i.e. one element directly connected to another element for rotation therewith.

FIG. 1 is a configuration diagram of a planetary gear train according to a first exemplary form of the present disclosure.

Referring to FIG. 1, a planetary gear train includes: first, second, third, fourth, and fifth planetary gear sets PG1, PG2, PG3, PG4, and PG5 disposed on the same axis; an input shaft IS; an output shaft OS; nine shafts TM1 to TM9 connecting each rotational element of the first, second, third, fourth, and fifth planetary gear sets PG1, PG2, PG3, PG4, and PG5; three clutches C1 to C3 and three brakes B1 to B3 as an engaging element; and a transmission housing H.

As a result, torque input to the input shaft IS from the engine is transmitted by an inter-complementation operation of the first, second, third, and fifth planetary gear sets PG1, PG2, PG3, PG4, and PG5 to be output through the output shaft OS.

In an exemplary form of the present disclosure, the planetary gear sets are arranged in the order of first, second, third, fourth, and firth planetary gear sets PG1, PG2, PG3, PG4, and PG5, from an engine side.

The input shaft IS is an input member and the torque from a crankshaft of an engine is input into the input shaft IS, after being torque-converted through a torque converter.

The output shaft OS is an output member, and being arranged on a same axis with the input shaft IS, delivers a shifted driving torque to a drive shaft through a differential apparatus.

The first planetary gear set PG1 is a single pinion planetary gear set and includes a first sun gear S1 being a first rotational element N1, a first planet carrier PC1 being a second rotational element N2 and supporting a plurality of first pinion gears P1 radially engaged with an external circumference side of the first sun gear S1 with an equal interval to be rotated and revolved, and a first ring gear R1 being a third rotational element N3 engaged with the plurality of first pinion gears P1 and torque-connected to the first sun gear S1.

The second planetary gear set PG2 is a single pinion planetary gear set and includes a second sun gear S2 being a fourth rotational element N4, a second planet carrier PC2 being a fifth rotational element N5 and supporting a plurality of second pinion gears P2 radially engaged with an external circumference side of the second sun gear S2 with an equal interval to be rotated and revolved, and a second ring gear R2 being a sixth rotational element N6 engaged with the plurality of second pinion gears P2 and torque-connected to the second sun gear S2.

The third planetary gear set PG3 is a single pinion planetary gear set and includes a third sun gear S3 being a seventh rotational element N7, a third planet carrier PC3 being an eighth rotational element N8 and supporting a plurality of third pinion gears P3 radially engaged with an external circumference side of the third sun gear S3 with an equal interval to be rotated and revolved, and a third ring gear R3 being a ninth rotational element N9 engaged with the plurality of third pinion gears P3 and torque-connected to the third sun gear S3.

The fourth planetary gear set PG4 is a single pinion planetary gear set and includes a fourth sun gear S4 being a tenth rotational element N10, a fourth planet carrier PC4 being an eleven rotational element N11 and supporting a plurality of fourth pinion gears P4 radially engaged with an external circumference side of the fourth sun gear S4 with an equal interval to be rotated and revolved, and a fourth ring gear R4 being a twelve rotational element N12 engaged with the plurality of fourth pinion gears P4 and torque-connected to the fourth sun gear S2.

The fifth planetary gear set PG5 is a single pinion planetary gear set and includes a fifth sun gear S5 being a thirteenth rotational element N13, a fifth planet carrier PC5 being a fourteenth rotational element N14 and supporting a plurality of fifth pinion gears P5 radially engaged with an external circumference side of the fifth sun gear S5 with an equal interval to be rotated and revolved, and a fifth ring gear R5 being a fifteenth rotational element N15 engaged with the plurality of fifth pinion gears P4 and torque-connected to the fifth sun gear S2.

Here, the third rotational element N3 is directly connected to the fourth rotational element N4, the fifth rotational element N5 is directly connected to the eighth rotational element N8, the sixth rotational element N6 is directly connected to the fifteenth rotational element N15, the seventh rotational element N7 is directly connected to the tenth rotational element N10 and the thirteenth rotational element N13, and the ninth rotational element N9 is directly connected to the eleven rotational element N11 such that the first, second, third, fourth, and fifth planetary gear sets PG1, PG2, PG3, PG4, and PG5 are operated with total nine shafts TM1 to TM9.

The nine shafts TM1 to TM9 will be described in further detail.

Some of the nine shafts TM1 to TM9 directly connect a plurality of rotation elements among the rotation elements of the planetary gear sets PG1, PG2, PG3, PG4, and PG5 with each other. The nine shafts may be rotation members that are connected to any rotation element of the rotation elements of the planetary gear sets PG1, PG2, PG3, PG4, and PG5, and rotate with the any one rotation element to transmit torque. The rotation members that selectively connect any rotation element with the transmission housing H may be fixed members that directly and fixedly connect any one rotation element to the transmission housing H.

The first shaft TM1 is connected to the second rotational element N2 {first planet carrier PC1} and is directly connected to the input shaft IS so as to be always operated as an input element.

The second shaft TM2 is connected to the fourteenth rotational element N14 {fifth planet carrier PC5} and is directly connected to the output shaft OS so as to be always operated as an output element.

The third shaft TM3 is connected, and preferably fixedly connected, to the seventh rotational element N7 {third sun gear S3}, the tenth rotational element N10 {fourth sun gear S4}, and the thirteenth rotational element N13 {fifth sun gear S5}.

The fourth shaft TM4 is connected, and preferably fixedly connected, to the sixth rotational element N6 {second ring gear R2} and the fifteenth rotational element N15 {fifth ring gear R5}.

The fifth shaft TM5 is connected, and preferably fixedly connected, to the third rotational element N3 {first ring gear R1} and the fourth rotational element N4 {second sun gear S2}.

The sixth shaft TM6 is connected, and preferably fixedly connected, to the fifth rotational element N5 (second planet carrier PC2) and the eighth rotational element N8 {third planet carrier PC3}.

The seventh shaft TM7 is connected, and preferably fixedly connected, to the ninth rotational element N9 {third ring gear R3} and the eleventh rotational element N11 {fourth planet carrier PC4}.

The eighth shaft TM8 is connected to the first rotational element N1 {first sun gear S1}.

The ninth shaft TM9 is connected to the twelfth rotational element N12 {fourth ring gear R4}.

Here, the first shaft TM1 is selectively connected to the fourth shaft TM4 to be torque-connected, and the first shaft TM1 and the fifth shaft TM5 are respectively connected to the seventh shaft TM7 while being selectively connected to be torque-connected.

Also, the third shaft TM3, the eighth shaft TM8, and the ninth shaft TM9 are selectively connected to the transmission housing H and are operated as a selectively fixed element.

Also, three clutches C1, C2, and C3 that are engaging elements are disposed at portions at which any two shafts among the nine shafts TM1 to TM9 including the input shaft IS and the output shaft OS are selectively connected with each other.

In addition, three brakes B1, B2, and B3 that are engaging elements are disposed at portions at which any one shaft among the nine shafts TM1 to TM9 is selectively connected with the transmission housing H.

Arrangement of the six engaging elements (three clutches C1 to C3 and three brakes B1 to B3) will be described in detail.

The first clutch C1 is disposed between the first shaft TM1 and the fourth shaft TM4 to selectively connect the first shaft TM1 and the fourth shaft TM4.

The second clutch C2 is disposed between the first shaft TM1 and the seventh shaft TM7 to selectively connect the first shaft TM1 and the seventh shaft TM7.

The third clutch C3 is disposed between the fifth shaft TM5 and the seventh shaft TM7 to selectively connect the fifth shaft TM5 and the seventh shaft TM7.

The first brake B1 is disposed between the third shaft TM3 and the transmission housing H to selectively connect and fixe the third shaft TM3 to the transmission housing H.

The second brake B2 is disposed between the eighth shaft TM8 and the transmission housing H to selectively connect and fix the eighth shaft TM8 to the transmission housing H.

The third brake B3 is disposed between the ninth shaft TM9 and the transmission housing H to selectively connect and fix the ninth shaft TM9 to the transmission housing H.

The engaging elements including the first, second, and third clutches C1, C2, and C3 and the first, second, and third brakes B1, B2, and B3 may be made of a multi-plate type hydraulic pressure friction engagement unit that is operated by hydraulic pressure supplied from a hydraulic pressure control apparatus, and the multi-plate type hydraulic pressure friction engagement unit of a wet type is mainly used, however it may be made of the engagement unit that may be operated by an electrical signal supplied from an electric control apparatus such as a dog clutch, a differential clutch, an electronic clutch, etc.

FIG. 2 is an operational chart for each shift-stage of an engaging element applied to a planetary gear train according to an exemplary form of the present disclosure.

Referring to FIG. 2, three engaging elements among the first, second, and third clutches C1, C2, and C3 and the first, second, and third brakes B1, B2, and B3 are operated at each shift stage in the planetary gear train.

The second clutch C2 and the first and second brakes B1 and B2 are simultaneously operated at the forward first speed stage D1.

Accordingly, in the state that the first shaft TM1 is interconnected with the seventh shaft TM7 by the operation of the second clutch C2, torque is input to the first shaft TM1.

Also, in this input state, while the third and eighth shafts TM3 and TM8 are operated as the fixed element by the operation of the first, second brakes B1 and B2, the torque is shifted into the forward first speed stage and the first forward first speed stage is output to the output shaft OS connected to the second shaft TM2.

The second and third clutches C2 and C3 and the first brake B1 are simultaneously operated at the forward second speed stage D2.

Accordingly, in the state that the first shaft TM1 is interconnected with the seventh shaft TM7 by the operation of the second clutch C2 and the fifth shaft TM5 is interconnected with the seventh shaft TM7 by the operation of the third clutch C3, the torque is input to the first shaft TM1.

In this input state, while the third shaft TM3 is operated as the fixed element by the operation of the first brake B1, the torque is shift into the second forward speed stage and the second forward speed stage is output to the output shaft OS connected to the second shaft TM2.

The third clutch C3 and the first and second brakes B1 and B2 are simultaneously operated at the forward third speed stage D3.

Accordingly, in the state that the fifth shaft TM5 is interconnected with the seventh shaft TM7 by the operation of the third clutch C3, the torque is input to the first shaft TM1.

Also, in this input state, while the third and eighth shafts TM3 and TM8 are operated as the fixed element by the operation of the first and second brakes B1 and B2, the torque is shift into the third forward speed stage and the third forward speed stage is output to the output shaft OS connected to the second shaft TM2.

The first and the third clutches C1 and C3 and the first brake B1 are simultaneously operated at the forward fourth speed stage D4.

Accordingly, in the state that the first shaft TM1 is interconnected with the fourth shaft TM4 by the operation of the first clutch C1 and the fifth shaft TM5 is interconnected with the seventh shaft TM7 by the operation of the third clutch C3, the torque is input into the first shaft TM1.

Also, in this input state, while the third shaft TM3 is operated as the fixed element by the operation of the first brake B1, the torque is shift into the fourth forward speed stage and the fourth forward speed state is output to the output shaft OS connected to the second shaft TM2.

The first and third clutches C1 and C3 and the second brake B2 are simultaneously operated at the forward fifth speed stage D5.

Accordingly, in the state that the first shaft TM1 is interconnected with the fourth shaft TM4 by the operation of the first clutch C1 and the fifth shaft TM5 is interconnected with the seventh shaft TM7 by the operation of the third clutch C3, the torque is input to the first shaft TM1.

Also, in this input state, while the eighth shaft TM8 is operated as the fixed element by the operation of the second brake B2, the torque is shift into the fifth forward speed stage and the fifth forward speed stage is output to the output shaft OS connected to the second shaft TM2.

The first, second, and third clutches C1, C2, and C3 are simultaneously operated at the forward sixth speed stage D6.

Accordingly, in the state that the first shaft TM1 is interconnected with the fourth shaft TM4 by the operation of the first clutch C1, the first shaft TM1 is interconnected with the seventh shaft TM7 by the operation of the second clutch C2, and the fifth shaft TM5 is interconnected with the seventh shaft TM7 by the operation of the third clutch C3, the torque is input to the first shaft TM1.

Thus, entire first, second, third, fourth, and fifth planetary gear sets PG1, PG2, PG3, PG4, and PG5 are integrally rotated, if the torque is input to the first shaft TM1, the torque is shift into the sixth forward speed stage of which the torque is output as input such that the sixth forward speed stage is output to the output shaft OS connected to the second shaft TM2.

The first and third clutches C1 and C3 and the third brake B3 are simultaneously operated at the forward seventh speed stage D7.

Accordingly, in the state that the first shaft TM1 is interconnected with the fourth shaft TM4 by the operation of the first clutch C1 and the fifth shaft TM5 is interconnected with the seventh shaft TM7 by the operation of the third clutch C3, the torque is input to the first shaft TM1.

Also, in this input state, while the ninth shaft TM9 is operated as the fixed element by the operation of the third brake B3, the torque is shift into the seventh forward speed stage and the seventh forward speed stage is output to the output shaft OS connected to the second shaft TM2.

The first clutch C1 and the second and third brakes B2 and B3 are simultaneously operated at the forward eighth speed stage D8.

Accordingly, in the state that the first shaft TM1 is interconnected with the fourth shaft TM4 by the operation of the first clutch C1, the torque is input to the first shaft TM1.

Also, in this input state, while the eighth and ninth shafts TM8 and TM9 are operated as the fixed element by the operation of the second and third brakes B2 and B3, the torque is shift into the eighth forward speed stage and the eighth forward speed stage is output to the output shaft OS connected to the second shaft TM2.

The first and second clutches C1 and C2 and the third brake B3 are simultaneously operated at the forward ninth speed stage D9.

Accordingly, in the state that the first shaft TM1 is interconnected with the fourth shaft TM4 by the operation of the first clutch C1 and the first shaft TM1 is interconnected with the seventh shaft TM7 by the operation of the second clutch C2, the torque is input to the first shaft TM1.

Also, in this input state, while the ninth shaft TM9 is operated as the fixed element by the operation of the third brake B3, the torque is shift into the ninth forward speed stage and the ninth forward speed stage is output to the output shaft OS connected to the second shaft TM2.

The second clutch C2 and the second and third brakes B2 and B3 are simultaneously operation at the forward tenth speed stage D10.

Accordingly, in the state that the first shaft TM1 is interconnected with the seventh shaft TM7 by the operation of the second clutch C2, the torque is input to the first shaft TM1.

Also, in this input state, while the eighth and ninth shafts TM8 and TM9 are operated as the fixed element by the operation of the second and third brakes B2 and B3, the torque is shift into the tenth forward speed stage and the tenth forward speed stage is output to the output shaft OS connected to the second shaft TM2.

The first, second, and third brakes B1, B2, and B3 are simultaneously operated at the reverse speed REV.

Accordingly, the torque is input to the first shaft TM1.

Also, in this input state, while the third, eighth, and ninth shafts TM3, TM8, and TM9 are operated as the fixed element by the operation of the first, second, and third brakes B1, B2, and B3, the torque is shift into the reverse speed stage and the reverse speed stage is output to the output shaft OS connected to the second shaft TM2.

As described above, the planetary gear train according to an exemplary form of the present disclosure applies only six engaging elements (i.e., three clutches C1, C2, and C3 and three brake sB1, B2, and B3) instead of the five planetary gear sets PG1, PG2, PG3, PG4, and PG5, thereby realizing the shift-stages for the ten forward speeds and one reverse speed.

In addition, since the gear shift ratio span is secured to be greater than 9.4, driving efficiency of the engine may be increased. In addition, since linearity of the ratios between gear shift stages can be secured due to multiple speed stages, drivability such as acceleration before and after shift, rhythmical engine speed, and so on may be improved.

In addition, while ten forward speed stages and one reverse speed stage are achieved, as the application of the engaging elements causing a drag loss such as clutches and brakes is reduced, torque delivery efficiency and fuel economy may be improved depending on the drag loss reduction.

In addition, since a planetary gear set of an output side in torque parallel type is used and torque is evenly shared to each planetary gear set and each engaging element, torque delivery efficiency and durability may be improved.

In addition, since five planetary gear sets are used to achieve ten forward speed stages and one reverse speed stage, flexibility of output gear ratios may be increased and linearity of step ratios may be improved.

While this present disclosure has been described in connection with what is presently considered to be practical exemplary forms, it is to be understood that the present disclosure is not limited to the disclosed forms, but, on the contrary, is intended to cover various modifications and equivalent arrangements included within the spirit and scope of the present disclosure.

What is claimed is:

1. A planetary gear train of an automatic transmission for a vehicle, the planetary gear train comprising:
   an input shaft configured to receive a torque from an engine;
   an output shaft configured output a torque;
   a first planetary gear set including first, second, and third rotation elements;
   a second planetary gear set including fourth, fifth, and sixth rotation elements;
   a third planetary gear set including seventh, eighth, and ninth rotation elements;
   a fourth planetary gear set including tenth, eleventh, and twelfth rotation elements;
   a fifth planetary gear set including thirteenth, fourteenth, and fifteenth rotational elements;
   a first shaft connected to the second rotational element and the input shaft;
   a second shaft connected to the fourteenth rotational element and the output shaft;
   a third shaft connected to the seventh rotational element, the tenth rotational element, and the thirteenth rotational element;
   a fourth shaft connected to the sixth rotational element and the fifteenth rotational element;
   a fifth shaft connected to the third rotational element and the fourth rotational element;
   a sixth shaft connected to the fifth rotational element and the eighth rotational element;
   a seventh shaft connected to the ninth rotational element and the eleventh rotational element;
   an eighth shaft connected to the first rotational element; and
   a ninth shaft connected to the twelfth rotational element.

2. The planetary gear train of claim 1, wherein
   the planetary gear train includes six engaging elements configured to selectively connect any two shafts selected from the nine shafts to each other, or a corresponding shaft to a transmission housing, and configured to realize forward or reverse speed stages by controlling three engaging elements selected from the six engaging elements.

3. The planetary gear train of claim 2, wherein
   the six engaging elements includes:
   three clutches configured to interconnect the selected two shafts among the nine shifts, and
   three brakes configured to selectively connect the corresponding shaft to the transmission housing, wherein the corresponding shaft is not connected to the input shaft or the output shaft.

4. The planetary gear train of claim 2, wherein
   the six engaging elements include:
   a first clutch disposed between the first shaft and the fourth shaft;
   a second clutch disposed between the first shaft and the seventh shaft;
   a third clutch disposed between the fifth shaft and the seventh shaft;
   a first brake disposed between the third shaft and the transmission housing;
   a second brake disposed between the eighth shaft and the transmission housing; and
   a third brake disposed between the ninth shaft and the transmission housing.

5. The planetary gear train of claim 1, wherein
   the first, second, and third rotational elements are respectively a first sun gear, a first planet carrier, and a first ring gear,
   the fourth, fifth, and sixth rotational elements are respectively a second sun gear, a second planet carrier, and a second ring gear,
   the seventh, eighth, and ninth rotational elements are respectively a third sun gear, a third planet carrier, and a third ring gear,
   the tenth, eleventh, and twelfth rotational element are respectively a fourth sun gear, a fourth planet carrier, and a fourth ring gear, and
   the thirteenth, fourteenth, and fifteenth rotational elements are respectively a fifth sun gear, a fifth planet carrier, and a fifth ring gear.

6. The planetary gear train of claim 1, wherein
   the first, second, third, fourth, and fifth planetary gear sets are disposed in a sequence of the first, second, third, fourth, and fifth planetary gear sets from an engine side.

7. A planetary gear train of an automatic transmission for a vehicle, the planetary gear train comprising:
   an input shaft configured to receive a torque of an engine;
   an output shaft configured to output a torque;
   a first planetary gear set including first, second, and third rotation elements;
   a second planetary gear set including fourth, fifth, and sixth rotation elements;
   a third planetary gear set including seventh, eighth, and ninth rotation elements;
   a fourth planetary gear set including tenth, eleventh, and twelfth rotation elements;

a fifth planetary gear set including thirteenth, fourteenth, and fifteenth rotational elements;
a first shaft connected to the second rotational element and the input shaft;
a second shaft connected to the fourteenth rotational element and the output shaft;
a third shaft connected to the seventh rotational element, the tenth rotational element, and the thirteenth rotational element;
a fourth shaft connected to the sixth rotational element and the fifteenth rotational element;
a fifth shaft connected to the third rotational element and the fourth rotational element;
a sixth shaft connected to the fifth rotational element and the eighth rotational element;
a seventh shaft connected to the ninth rotational element and the eleventh rotational element;
a plurality of shafts selectively connected to the transmission housing, wherein the plurality of shafts are respectively connected to a corresponding rotational element of the first and fourth planetary gear sets that is not connected to another rotational element selected from the rotational elements of the five planetary gear sets.

8. The planetary gear train of claim 7, wherein the plurality of shafts include:
an eighth shaft connected to the first rotational element; and
a ninth shaft connected to the twelfth rotational element.

9. The planetary gear train of claim 8, wherein the planetary gear train further includes:
three clutches configured to interconnect two shafts among the nine shafts; and
three brakes configured to selectively connect a transmission housing to any shaft selected from the nine shafts, wherein the selected shaft is not connected to the input shaft or the output shaft.

10. The planetary gear train of claim 9, wherein
The three clutches include:
a first clutch disposed between the first shaft and the fourth shaft;
a second clutch disposed between the first shaft and the seventh shaft; and
a third clutch disposed between the fifth shaft and the seventh shaft, and wherein the three brakes include:
a first brake disposed between the third shaft and the transmission housing;
a second brake disposed between the eighth shaft and the transmission housing; and
a third brake disposed between the ninth shaft and the transmission housing.

11. The planetary gear train of claim 7, wherein
the first, second, and third rotational elements of the first planetary gear set are respectively a first sun gear, a first planet carrier, and a first ring gear,
the fourth, fifth, sixth rotational elements of the second planetary gear set are respectively a second sun gear, a second planet carrier, and a second ring gear,
the seventh, eighth, and ninth rotational element of the third planetary gear set are respectively a third sun gear, a third planet carrier, and a third ring gear,
the tenth, eleventh, and twelfth rotational elements of the fourth planetary gear set are respectively a fourth sun gear, a fourth planet carrier, and a fourth ring gear, and
the thirteenth, fourteenth, and fifteenth rotational elements of the fifth planetary gear set are respectively a fifth sun gear, a fifth planet carrier, and a fifth ring gear.

12. The planetary gear train of claim 7, wherein the first, second, third, fourth, and fifth planetary gear sets are disposed in sequence of the first, second, third, fourth, and fifth planetary gear sets from an engine side.

13. A planetary gear train of an automatic transmission for a vehicle, the planetary gear train comprising:
an input shaft configured to receive a torque from an engine;
an output shaft configured to output a torque;
a first planetary gear set including first, second, and third rotation elements;
a second planetary gear set including fourth, fifth, and sixth rotation elements;
a third planetary gear set including seventh, eighth, and ninth rotation elements;
a fourth planetary gear set including tenth, eleventh, and twelfth rotation elements;
a fifth planetary gear set including thirteenth, fourteenth, and fifteenth rotational elements;
a first shaft connected to the second rotational element and the input shaft;
a second shaft connected to the fourteenth rotational element and the output shaft;
a third shaft connected to the seventh rotational element, the tenth rotational element, and the thirteenth rotational element;
a fourth shaft connected to the sixth rotational element and the fifteenth rotational element;
a fifth shaft connected to the third rotational element and the fourth rotational element;
a sixth shaft connected to the fifth rotational element and the eighth rotational element;
a seventh shaft connected to the ninth rotational element and the eleventh rotational element;
eighth and ninth shafts selectively connected to a transmission housing, wherein the eighth and ninth shafts are respectively connected to corresponding rotational elements of the first and fourth planetary gear sets that are not connected to another rotational element selected from the rotational elements of the five planetary gear sets.

14. The planetary gear train of claim 13, further comprising:
clutches configured to selectively connect the first shaft and the fourth shaft to each other, the first shaft and the seventh shaft to each other, and the fifth shaft and the seventh shaft to each other through a corresponding clutch, respectively,
wherein the third shaft is selectively connected to the transmission housing,
the eighth shaft is connected to the first rotational element, and
the ninth shaft is connected to the twelfth rotational element.

15. The planetary gear train of claim 14, wherein the clutches include:
a first clutch disposed between the first shaft and the fourth shaft;
a second clutch disposed between the first shaft and the seventh shaft; and
a third clutch disposed between the fifth shaft and the seventh shaft, and wherein the planetary gear train further includes:
a first brake disposed between the third shaft and the transmission housing;
a second brake disposed between the eighth shaft and the transmission housing; and a third brake disposed between the ninth shaft and the transmission housing.

16. The planetary gear train of claim 13, wherein the first, second, and third rotational element of the first planetary gear set are respectively a first sun gear, a first planet carrier, and a first ring gear, the fourth, fifth, sixth rotational elements of the second planetary gear set are respectively a second sun gear, a second planet carrier, and a second ring gear, the seventh, eighth, and ninth rotational element of the third planetary gear set are respectively a third sun gear, a third planet carrier, and a third ring gear, the tenth, eleventh, and twelfth rotational elements of the fourth planetary gear set are respectively a fourth sun gear, a fourth planet carrier, and a fourth ring gear, and the thirteenth, fourteenth, and fifteenth rotational elements of the fifth planetary gear set are respectively a fifth sun gear, a fifth planet carrier, and a fifth ring gear.

17. The planetary gear train of claim 13, wherein:

the first, second, third, fourth, and fifth planetary gear sets are disposed in sequence of the first, second, third, fourth, and fifth planetary gear sets from an engine side.

\* \* \* \* \*